Figure 1:
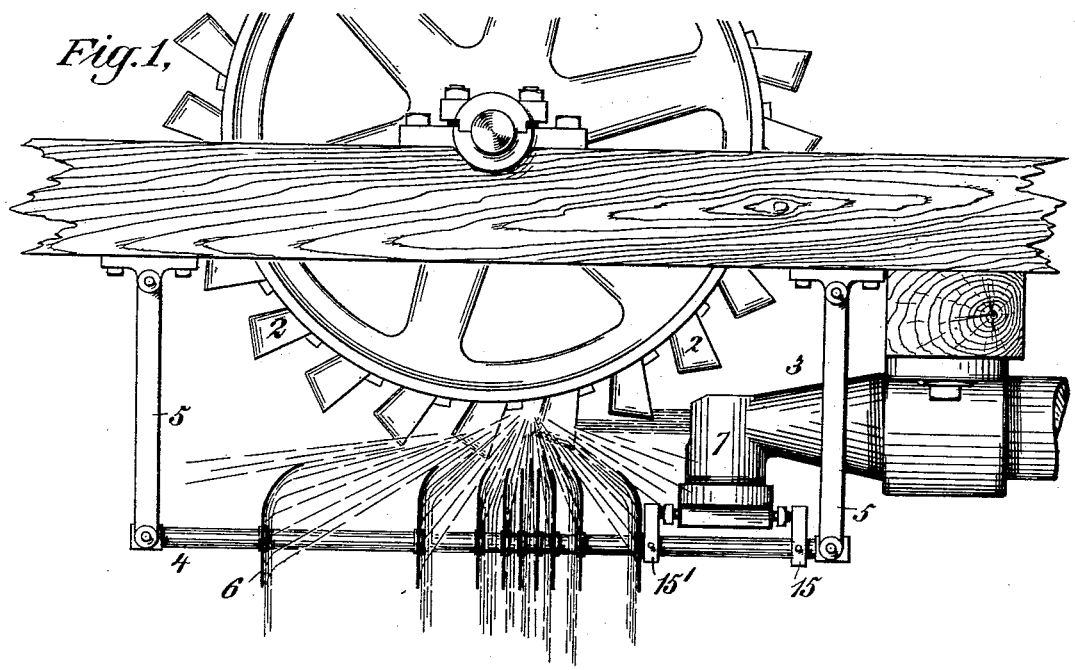

(No Model.) 4 Sheets—Sheet 1.

H. D. WILLIAMS.
GOVERNOR FOR WATER MOTORS.

No. 580,097. Patented Apr. 6, 1897.

Witnesses.
Wm. Strunk, Jr.
Harris J. Ryan

Inventor
Harvey D. Williams
per
E. M. Marble & Sons
Attorneys (No Model.) 4 Sheets—Sheet 2.
H. D. WILLIAMS.
GOVERNOR FOR WATER MOTORS.
No. 580,097. Patented Apr. 6, 1897.
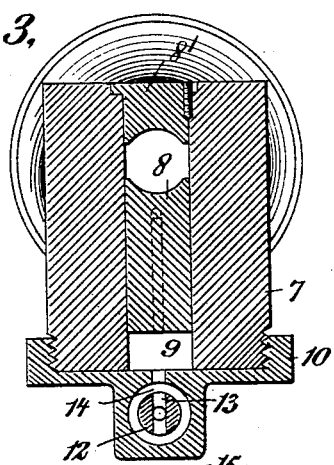
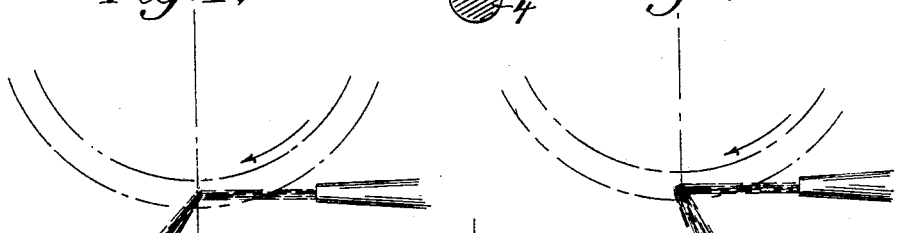
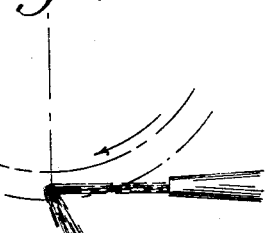
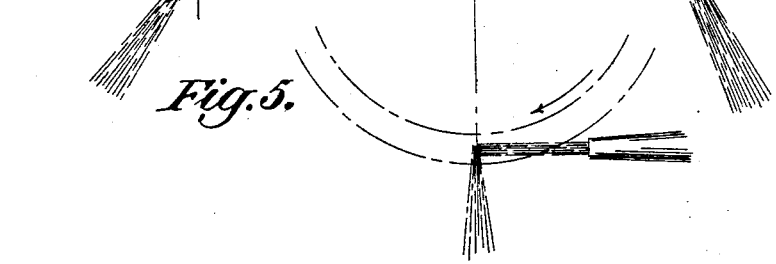
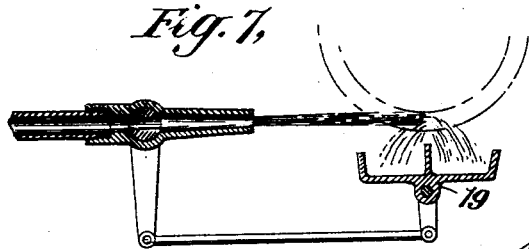
WITNESSES:
W. Strunk jr.
Harris J. Ryan
INVENTOR
Harvey D Williams
BY
E. M. MacLeod Jones
ATTORNEYS (No Model.) 4 Sheets—Sheet 3.
H. D. WILLIAMS.
GOVERNOR FOR WATER MOTORS.

No. 580,097. Patented Apr. 6, 1897.

Witnesses.
Wm. Strunk, jr.
Harris J. Ryan.

Inventor
Harvey D. Williams
per
E. M. Macpherson
Attorneys

THE NORRIS PETERS CO., PHOTO-LITHO., WASHINGTON, D. C.

(No Model.) 4 Sheets—Sheet 4.
H. D. WILLIAMS.
GOVERNOR FOR WATER MOTORS.
No. 580,097. Patented Apr. 6, 1897.
*Fig. 9,*
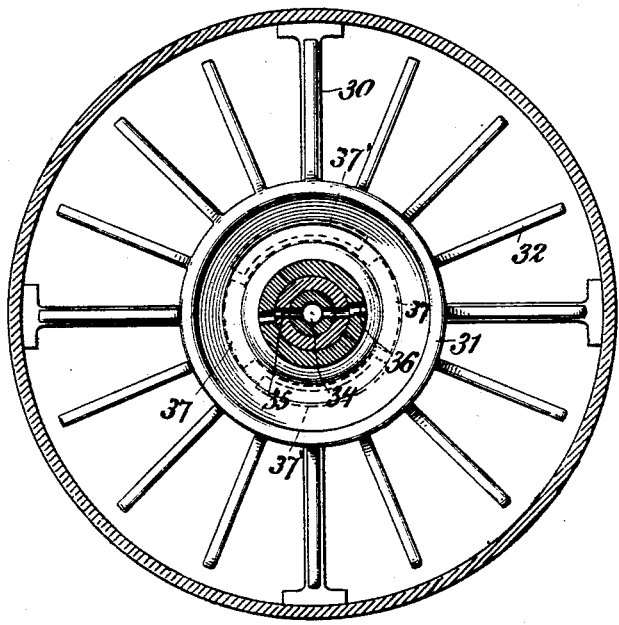
WITNESSES:
W. Strunk, Jr.
Harris J. Ryan
INVENTOR
Harvey D. Williams
BY
E. M. Marbleton
ATTORNEYS

UNITED STATES PATENT OFFICE.

HARVEY D. WILLIAMS, OF ITHACA, NEW YORK.

GOVERNOR FOR WATER-MOTORS.

SPECIFICATION forming part of Letters Patent No. 580,097, dated April 6, 1897.

Application filed March 13, 1896. Serial No. 583,123. (No model.)

*To all whom it may concern:*

Be it known that I, HARVEY D. WILLIAMS, a citizen of the United States, residing at Ithaca, in the county of Tompkins and State of New York, have invented certain new and useful Improvements in Governors for Water-Motors; and I do hereby declare the following to be a full, clear, and exact description of the invention, such as will enable others skilled in the art to which it appertains to make and use the same.

My invention relates to governors or regulators for water wheels or motors employed for regulating the speed of the wheel and maintaining constant speed under varying conditions of load; and my invention relates particularly to a governor designed to maintain the speed of water-wheels constant at the speed of maximum efficiency; and my invention is particularly applicable to wheels of the Pelton or hurdy-gurdy type and of the turbine type.

My invention consists in the novel regulating-valve employed for regulating the speed of the wheel, in the novel means employed for operating this regulating-valve, in the novel means employed for balancing said valve, thereby making it sensitive in action, and in the novel combination, construction, and arrangement of the parts of the apparatus.

The objects of my invention are, first, to provide a governor or regulator for water-wheels which shall be more effective than former governors, shall be quicker in its action, and shall give better regulation; second, to provide a governor which shall keep the speed of a water-wheel practically constant at the speed of maximum efficiency; third, to provide a governor having few parts and few joints and which shall require but little power in its operation; fourth, to provide an improved form of valve for regulating the flow of water which shall be more rapid and more delicate in its action than former valves and shall require less power for its operation; fifth, to provide new and better means for operating this valve according to variations in the speed of the wheel; sixth, to provide means for balancing this valve, and, seventh, to provide a governor which shall be more simple, compact, efficient, and sensitive than former governors, which shall not be liable to derangement, and which shall be as inexpensive as possible. These objects are attained in the governor for water-wheels herein described, and illustrated in the drawings which accompany and form a part of this application, in which the same reference-numerals indicate the same or corresponding parts, and in which—

Figure 2:
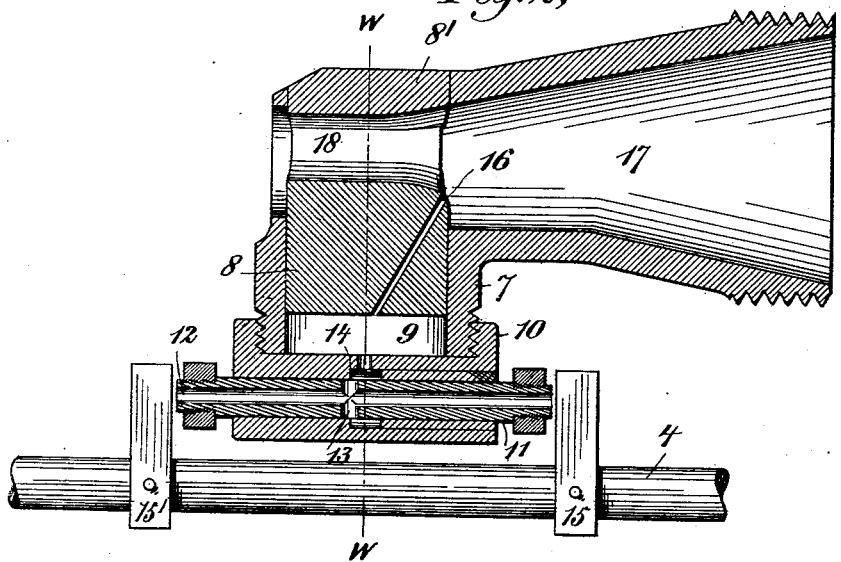
Figure 8:
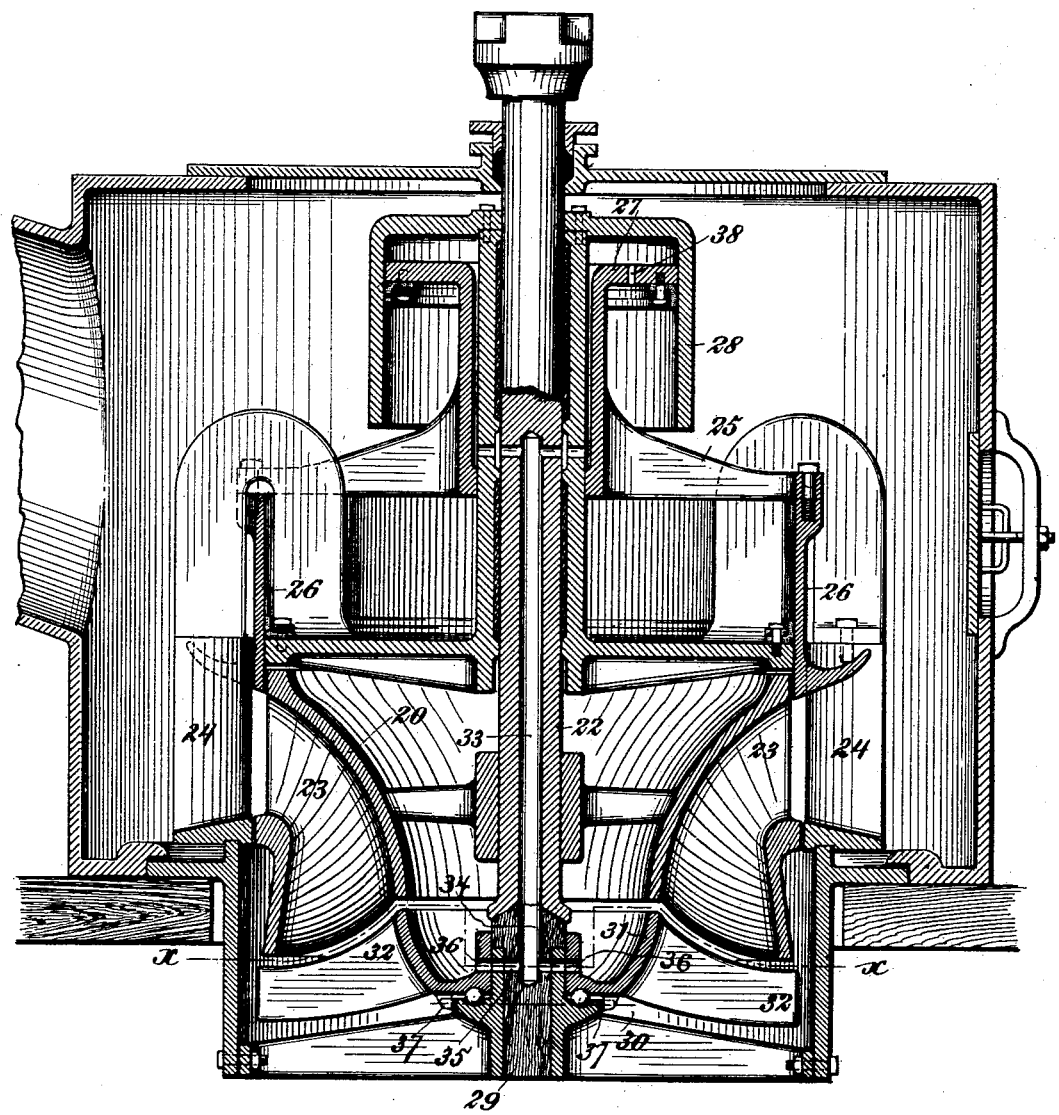

Figure 1 is an elevation of a water-wheel of the Pelton type with my governor attached, the case which usually surrounds water-wheels of this type being removed. Fig. 2 is a central vertical section of the nozzle, showing the regulating-valve by which the flow of water through the nozzle is regulated. Fig. 3 is a transverse vertical section of the nozzle, taken on the line $w\ w$ of Fig. 2. Figs. 4, 5, and 6 are views illustrating the direction of flow of the water from the buckets of a water-wheel when the wheel is revolving above the speed of maximum efficiency, at the speed of maximum efficiency, and below the speed of maximum efficiency, respectively. Fig. 7 illustrates a modification of the type of governor shown in Fig. 1, which may also be applied to Pelton wheels. Fig. 8 illustrates the application of a governor working on the same principle as the governor shown in Fig. 1 to turbine wheels; and Fig. 9 is a horizontal transverse section of the turbine on the line $xx$ of Fig. 8, showing the dash-plates by which the governor is operated, and also showing the valve-ports of the waste-passage by which the main governor valve or gate is operated.

With well-designed water-wheels of either the Pelton or the turbine type, revolving at the speed of maximum efficiency, the velocity of the entering water is entirely lost in passing through the buckets, and the water falls "dead," vertically in Pelton wheels as ordinarily arranged and in vertical-discharge turbines, and outwardly and then downwardly in horizontal-discharge turbines. If the wheel be underloaded at a fixed gate-opening, so that it revolves at a speed higher than that of maximum efficiency, the velocity of the water is not entirely lost, and the water as it leaves the buckets is projected forward in the direction of rotation of the wheel. If the wheel be overloaded at a fixed gate-opening, so as to revolve at a speed lower than the speed of maximum efficiency, the water as it leaves the buckets is projected backward. This I have illustrated in Figs. 4, 5, and 6 of the drawings, which show diagrammatically how the water is discharged from a Pelton wheel when running above the speed of maximum efficiency, at the speed of maximum efficiency, and below the speed of maximum efficiency, respectively. The water issues from a nozzle in a jet and impinges successively upon a series of buckets mounted upon the periphery of a revolving wheel. Such a wheel is shown in greater detail in Fig. 1. After the water has impinged upon the surface of a bucket it falls, and the buckets are so shaped as to afford the freest possible exit to the water after it shall have been in contact with the buckets a sufficient length of time to impart its energy thereto. If the wheel be underloaded, however, for the quantity of water flowing, the speed of the wheel will be too high and not all of the velocity of the water will have been lost, so that the water is projected forwardly as it leaves the buckets, as shown in Fig. 4. If the wheel be overloaded for the amount of water flowing, then the water is thrown backward, as shown in Fig. 6. In both of these cases a loss of efficiency results. If, however, the speed of the wheel is that of maximum efficiency, the velocity of the water of the jet is entirely lost without being thrown backward and the greater portion of the water falls directly downward, as in Fig. 5.

I have found that by placing in the stream of water discharged from the wheel movable dash-plates, which shall be moved in one direction or the other according to the direction in which the water discharged from the wheel flows at the instant after it leaves the buckets, and by providing a valve or gate controlling the flow of water into the buckets arranged to be operated by the movements of such dash-plates, there is produced a very simple, sensitive, and quick-acting governor which keeps the wheel closely to speed and to the speed of maximum efficiency.

Referring now to the governors shown in the drawings, and particularly for the present to Figs. 1, 2, and 3, which illustrate the application of my governor to a wheel of the Pelton type, 1 is the bucket-wheel, revolubly mounted and having secured to its periphery suitable cup-shaped buckets 2, of the usual construction.

3 is the nozzle through which water is projected into the buckets. This nozzle contains a regulating-valve for regulating the flow of water through the nozzle, which is illustrated in the detail views, Figs. 2 and 3.

4 is a rod movably supported below the buckets 2, the particular support illustrated in the drawings being two swinging levers 5 5, by which it is suspended. Upon this rod are a series of dash-plates 6, located in the path of the stream of water discharged from the buckets. The dash-plates 6 are so placed along the rod 4 and their tops so curved that each will receive its proportion of the water discharged from the buckets when the wheel is running at the speed of maximum efficiency.

The nozzle 3 has on its end a cylindrical boss 7, within which is the regulating-valve, operated, as hereinafter described, by the movement of the dash-plates 6, and by which the flow of water through the nozzle is regulated. This valve is formed by a plate or block 8, arranged to slide up and down in a valve or balance chamber 9 in the boss 7 and which opens into the bore of the nozzle. For convenience in construction the balance-chamber 9 may be formed by slitting or cutting the chamber clear through the bore of the nozzle and the top thereof and closing the upper or front end of the chamber by a plug 8', having a slot in which the valve 8 works and which therefore forms part of the balance-chamber 9.

The bottom of the chamber 9 is closed by a screw-cap 10. The cap 10 has a horizontal valve-chamber, in which slides an auxiliary valve 11, having a longitudinal bore 12, with lateral ports 13, adapted to register with a waste-passage 14 of the chamber 9 when the valve-rod is in or near mid-position. Upon the dash-plate rod 4 are abutments 15 and 15', adapted to engage with the ends of the auxiliary valve 11 and move the same backward or forward when the position of the dash-plates 6 is changed owing to a change in direction of the water discharged from the buckets 2. Stop-nuts upon the ends of the valve 11 limit its movement and that of the rod 4.

In the valve-block 8 is a small water-passage 16, connecting the interior portion 17 of the nozzle—that portion which is back of the block 8 and of the contracted throat 18 formed thereby in the bore of the nozzle—with the valve-chamber below said block. The pressure of the water in the larger portion 17 of the nozzle is always greater than the pressure in the throat 18, where the velocity of the water is higher, and therefore if the valve-chamber 9, below or in rear of the valve-block 8, is closed water passing through the passage 16 will fill this chamber and will produce a pressure behind the valve-block 8 greater than the pressure on the top or front face of the valve-block. The valve-block will be forced upward, therefore, if the pressure in the valve-chamber 9 remains the same, until it reaches the plug 8', thus almost closing the mouth of the nozzle. By the operation of the governor, however, the ports 13 of the auxiliary valve 11 are kept in communication with the waste-passage 14, except when the wheel is running very light, permitting some water to escape from the bottom of the chamber 9 through the passage 14, ports 13, and passage 12, thus reducing somewhat the pressure below the valve 8; and in the operation of the governor the amount of water flowing through the passage of the valve 11 is so regulated as to keep the valve 8 practically stationary at the position which gives the proper size of stream for rotating at maximum efficiency the water-wheel under the load at which it is working, the valve-ports 13 opening when the stream from the nozzle is too small and closing when the stream from the nozzle is too large.

The operation of my governor is as follows: Water passing through the nozzle 3 is discharged in a jet into the buckets 2 of the bucket-wheel 1, causing this wheel to revolve. As the buckets revolve water is discharged and falls between the dash-plates 6. If the wheel is running at the speed of maximum efficiency, by far the greater portion of this water falls directly downward, and therefore has no tendency to move these plates horizontally. Some water of course falls obliquely, but by properly spacing the dash-plates of the rod 4 the influence of that water which falls forwardly may be counteracted by the influence of the water which falls rearwardly. If, however, the wheel be running beyond the speed of maximum efficiency, the direction of the main body of water falling from the buckets is not directly downward, but obliquely forward and downward. Water thus striking upon these plates 6 in an oblique direction moves the plates and the rod 4 to the left of Fig. 1, causing the abutment 15 to strike the end of the horizontal sliding valve 11 and move the same to the left, closing partly or entirely the valve-port 13. The flow of water from the valve-chamber 9 being thus restricted, the pressure in this valve-chamber rises, causing the valve 8 to rise and so to reduce the size of stream flowing from the nozzle 3. The size of stream being thus reduced, the speed of the wheel falls and the dash-plates 6 move backward slightly, opening the valve 13 sufficiently to reduce the pressure in the valve-chamber 9 to the pressure above the valve 8, thus holding the valve stationary.

If the speed of the wheel falls too low, the greater portion of the water discharged from the buckets 2 will fall not directly downward, but downwardly and rearwardly, thus acting upon the dash-plates and moving the rod 4 to the right. This movement causes the abutment 15' to strike the end of the valve 11, moving this valve to the right and opening partly or completely the port 13. Water is thereby permitted to escape from the valve-chamber 9, thus reducing the pressure therein and causing the valve 8 to fall, thus increasing the size of the stream flowing from the nozzle 3. The speed of the wheel being thereby increased, the dash-plates move back to their former position, since the water from the buckets is once more discharged directly downward, thus closing the port 13 sufficiently so that the valve 8 shall be held stationary.

I find in practice that this governor is very sensitive, responds quickly to variations in load upon the wheel, and keeps the wheel with practical uniformity at the speed at which the wheel operates most efficiently. The dash-plates 6, being close to the buckets 2, are affected instantly by the change in direction of the falling discharge-water due to any slight change in the speed of the wheel, and act equally quickly upon the regulating-valve in the nozzle 3, which itself acts quickly, since it is perfectly balanced. The sensitiveness of the governor may be varied by varying the size of the water-passages 16 and 14, the size of which determines the rapidity of movement of the valve 8. In any case but little water is wasted through the passage 16, as it may always be small.

In Fig. 7 is illustrated a modification of this governor. A dash-plate formed like a trough 19, having a central partition, is pivotally mounted below the center of a Pelton wheel. If an excess of water fall upon one side of the partition, the dash-plate will be tilted in one direction, and if an excess of water fall upon the other side of the partition the dash-plate will be caused to tilt in the other direction, its normal position being substantially horizontal. This movement of the plate may be utilized to move an ordinary rotary plug-valve, as shown, or to operate the valve shown in Figs. 2 and 3.

In Figs. 8 and 9 I have illustrated the application of a governor of the same type as that shown in Figs. 1, 2, and 3 to the governing of a water-wheel of the common turbine type. In these figures, 20 is the turbine wheel, mounted upon a vertical shaft 22 and having in its sides buckets 23 of the ordinary form. 24 24 are the ordinary guide-plates, and 25 the ordinary gate-valve, which by rising or falling controls the flow of water to the buckets 23. At one end the valve is provided with a cylindrical portion 26, which when the valve descends closes the passages between the guide-plates and so prevents the water from passing into the buckets 23. At the other end of the valve 25 is a head or piston 27, located within a counterbalance-chamber 28. The shaft 22 of the water-wheel is mounted upon the usual step 29, supported in the usual manner by a bridge 30, and upon this bridge is revolubly mounted, preferably upon ball-bearings, a dash-plate wheel 31, having radial projecting arms or dash-plates 32, so placed as to be in the stream of water which flows from the buckets 23 downwardly into the discharge-passage of the wheel. These arms 32 correspond substantially with the dash-plates 6. (Shown in Fig. 1.)

The shaft 22 is hollow, having within it a water-passage 33, communicating with a similar water-passage 34 in the step 29, having horizontal discharge-ports 35 35, adapted to register with corresponding ports 36 36 in the hub of the dash-plate wheel 31. The wheel 31 has projections 37 in its bottom engaging with lugs 37' of the bridge 30, so that the motion of the dash-plate wheel 31 is limited.

At its upper end the water-passage 33 of the shaft 22 communicates, through ports in the bearing-sleeve through which the shaft passes with the upper portion of the balance-chamber 28 above the piston 27. In the piston 27 is a small port 38, by which water is permitted to pass from the chamber surrounding the water-wheel, through the port 38 and through the waste-passages 33 34 and the ports 35 and 36, into the discharge-passage of the water-wheel.

The piston 27 is made of such area that when the ports 36 and 35 are wide open, so that water has free passage from the top of the counterbalance-chamber and the pressure on the top or rear face of the piston is practically nothing, the pressure on the bottom or front face of the piston will be sufficient to lift the valve 25. The effect of restricting the passage of the water through the waste-passage 33 is to increase the pressure upon the rear face of the piston and so to reduce its counterbalancing effect, thus causing the valve 25 to fall and to permit less water to flow through the buckets 23. It will therefore be seen that closing or opening of the ports 35 and 36 adjusts the position of the gate 25.

The operation of the governor is as follows: If the wheel is running at the speed of maximum efficiency, the water discharged from the buckets 23 falls directly downward and has no influence upon the dash-plates 32. If, however, the wheel be running too fast, water does not fall directly downward from the buckets 23, but is projected forward slightly, thus striking upon the sides of the dash-plates 32 and causing the dash-plate wheel 31 to revolve slightly, so as to close the ports 35 and 36, thereby restricting or stopping the flow of water through the waste-passages 34 and 33 and causing the valve 25 to fall and restrict the flow of water. As the valve closes the speed of the wheel is brought to normal, thus swinging back the wheel 31 and opening partly the ports 35 and 36. If, on the other hand, the wheel is running too slow, the water falling from the buckets 23 is projected backward, striking the sides of the dash-plates 32 and turning the dash-plate wheel 31, so as to close the ports 36, thereby permitting or increasing the flow of water through the waste-passages 33 and 34, thus increasing the supporting-power of the piston 27 and causing the valve 25 to rise and opening more widely the passages to the buckets 23.

It will be seen that although the governor shown in Fig. 8 differs somewhat in appearance from the governor shown in Fig. 1, because of the difference in the types of wheels to which they are applied, they are substantially the same. The arms 32 and the wheel 31 correspond to the dash-plates 6 and the horizontal rod 4. The passages 34 and 33 correspond to the port 13 and passage 12. The counterbalance-chamber 28 corresponds to the valve or balance chamber 9 of Figs. 2 and 3. The valve 25 corresponds to the valve-block 8 of Fig. 2, and the port 38 corresponds to the passage 16 of Fig. 2. It will be seen, therefore, that these governors are substantially the same in principle and operation, the differences in the forms of the parts being due simply to the difference in the types of water-wheels to which the governors are applied.

The governor for turbine wheels is likewise applicable to horizontal-discharge wheels, the change in direction of discharge from vertical to horizontal in no way affecting the operation of the governor.

Having thus completely described my invention, what I claim, and desire to secure by Letters Patent, is—

1. In a water-wheel governor, the combination, with a plate movably mounted in the discharge-stream of the water-wheel and arranged to be moved by a change in the direction of flow of the water, of means for regulating the speed of the wheel, operated by the movement of said plate.

2. In a water-wheel governor, the combination, with a regulating-valve controlling the speed of the wheel, of a plate movably mounted in the discharge-stream of the wheel, and arranged to be moved by a change in the direction of said stream, and means for operating said regulating-valve by the movement of said plate.

3. In a water-wheel governor, the combination, with a regulating-valve controlling the speed of the wheel, of a series of dash-plates movably mounted in the discharge-stream of the wheel and in close proximity to the buckets thereof, said plates being arranged to be moved by a change in the direction of said stream, and means for operating said regulating-valve by the movement of said dash-plates, substantially as described.

4. In a regulator for water-wheels, the combination, with the supply-passage of the water-wheel, and a valve arranged to restrict the flow of water therethrough, of a balance-chamber in which said valve moves, means for admitting water to said chamber to operate said valve, a water-passage through which water may escape from said chamber, an auxiliary valve controlling the flow of water from said chamber, dash-plates movably mounted in the discharge-stream of the wheel and arranged to be moved by variations in the direction of flow of the water, and means operated by the movement of said dash-plates for operating said auxiliary valve, substantially as described.

5. In a regulator for water-wheels, the combination, with the supply-passage of the water-wheel, and a valve arranged to restrict the flow of water therethrough and having upon its face the water-pressure in the restricted portion of said passage, of a balance-chamber in which said valve moves, means for admitting water to said chamber in rear of said valve, a water-passage through which water may escape from said chamber, an auxiliary valve controlling the flow of water from said chamber, dash-plates movably mounted in the discharge-stream of the wheel and arranged to be moved by change in the direction of said stream, and means for operating said auxiliary valve by the movement of said dash-plates, substantially as described.

6. In a water-wheel, the combination, with a series of buckets revolubly mounted, a nozzle arranged to project a jet of water into said buckets successively, and a regulating-valve controlling the flow of water through said nozzle, of a series of dash-plates located below said buckets and in the discharge-stream therefrom, movably mounted, and arranged to be moved by a change in the direction of said stream, and means for operating said valve by the movement of said dash-plates, substantially as described.

7. In a water-wheel, the combination, with a series of buckets revolubly mounted, of a nozzle arranged to project a jet of water into said buckets successively, having a transverse valve-chamber arranged transversely to and in communication with the bore of the nozzle, and having opposite the mouth of said valve-chamber a corresponding opening closed by a plug 8', a valve-block in said valve-chamber adapted to move back and forth therein, one end of said block being adapted to project into and move across the bore of the nozzle, thereby restricting the flow of water therethrough, a water-passage connecting the valve-chamber in rear of the valve with the bore of the nozzle in rear of said valve, a waste-passage leading from the valve-chamber in rear of the valve, and an auxiliary valve controlling the pressure of water in said valve-chamber, substantially as described.

8. In a water-wheel, the combination, with a series of buckets revolubly mounted, of a nozzle arranged to project a jet of water into said buckets successively, having a valve-chamber arranged transversely to and in communication with the bore of the nozzle, a valve-block in said chamber adapted to move back and forth therein, one end of said block being adapted to project into and move across the bore of the nozzle, thereby restricting the flow of water therethrough, a water-passage in said valve-block connecting the valve-chamber in rear of said valve with the bore of the nozzle in rear of said valve, a waste-passage leading from the valve-chamber in rear of the valve, and an auxiliary valve controlling the pressure in said valve-chamber, substantially as described.

9. In a water-wheel, the combination, with a series of buckets revolubly mounted, a nozzle arranged to project a jet of water into said buckets successively, a boss projecting from said nozzle and having within it a valve-chamber in communication with the bore of the nozzle, caps closing the ends of said valve-chamber, and a valve therein adapted to move across the bore of said nozzle and so to restrict the flow of water therethrough, of a water-passage connecting the valve-chamber in rear of said valve with the rear portion of the bore of the nozzle, a waste-passage in the rear cap of said boss through which water may escape from said chamber, a sliding auxiliary valve having a port adapted to communicate with said passage, and means, operated by variations in speed of the wheel, for moving said sliding valve to place its port into or out of communication with said waste-passage, substantially as described.

10. In a water-wheel, the combination, with a series of buckets revolubly mounted, a nozzle arranged to project a jet of water into said buckets successively, a boss projecting from said nozzle and having within it a valve-chamber in communication with the bore of the nozzle, caps closing the ends of said valve-chamber, and a valve therein adapted to move across the bore of said nozzle and so to restrict the flow of water therethrough, of a water-passage connecting the valve-chamber in rear of said valve with the rear portion of the bore of the nozzle, a waste-passage in the rear cap of said boss through which water may escape from said chamber, a sliding auxiliary valve having a port adapted to communicate with said passage, dash-plates mounted upon a movable rod 4 below the buckets of the water-wheel and in the discharge-stream therefrom, and arranged to be moved by a change in direction of said stream, and abutments upon said rod adapted to engage with the ends of the sliding auxiliary valve, whereby the port of said valve is moved into or out of communication with the waste-passage as the speed of the wheel varies, substantially as described.

In testimony whereof I affix my signature in presence of two witnesses.

HARVEY D. WILLIAMS.

Witnesses:
W. STRUNK, Jr.,
HARRIS J. RYAN.